Jan. 14, 1964   K. H. ROGERS ETAL   3,117,751
MEANS FOR REMOVING BOUNDARY LAYER AIR FROM AIRCRAFT
Filed Dec. 1, 1961   2 Sheets-Sheet 1
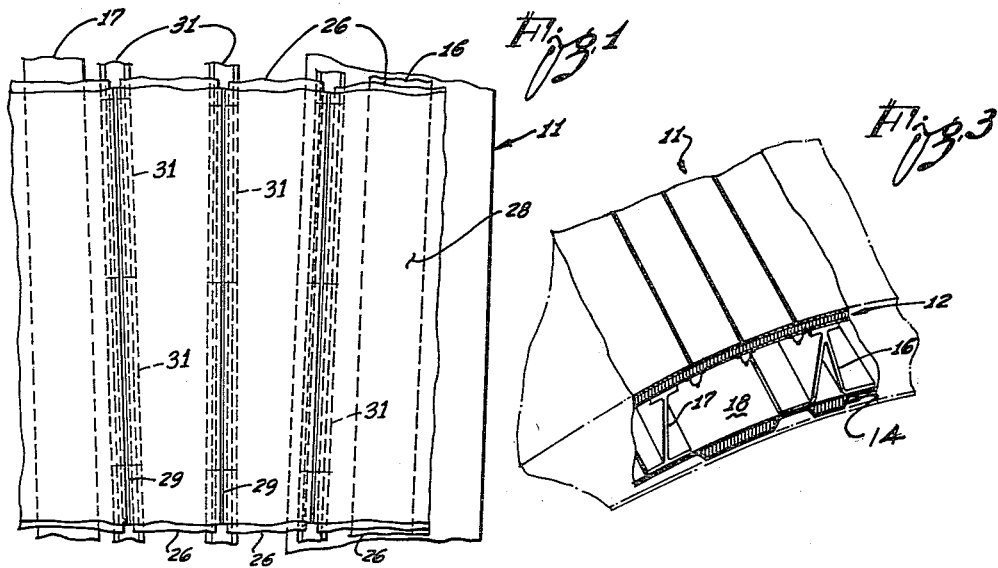
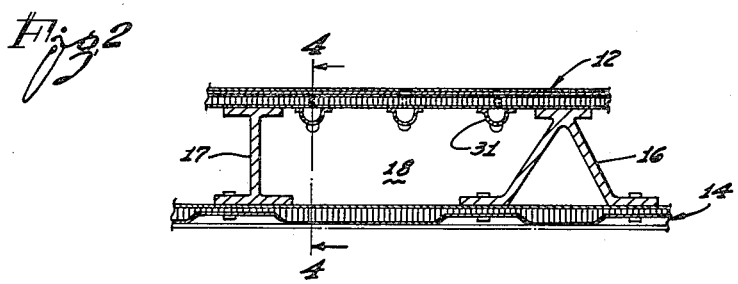
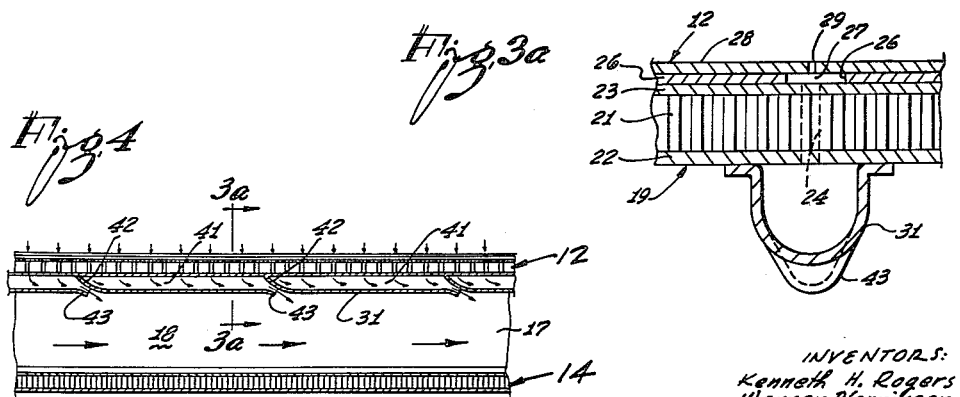
INVENTORS:
Kenneth H. Rogers
Werner Pfenninger
Agent

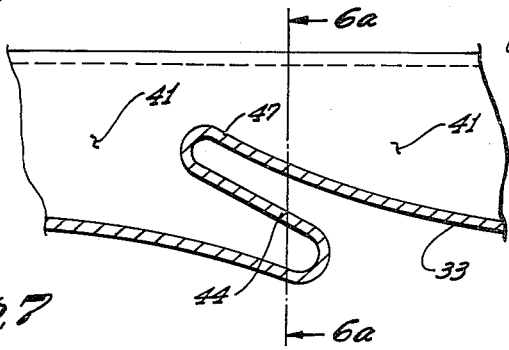
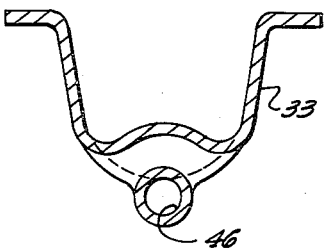
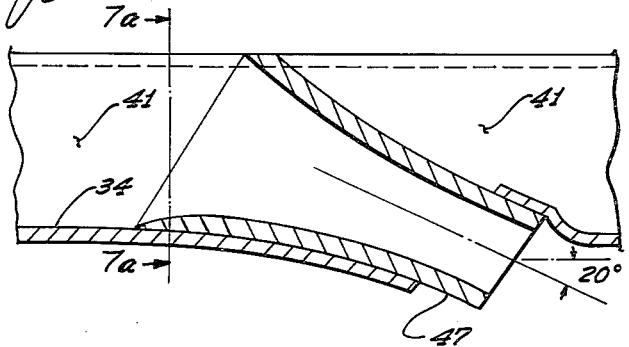
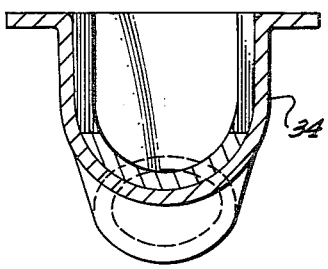
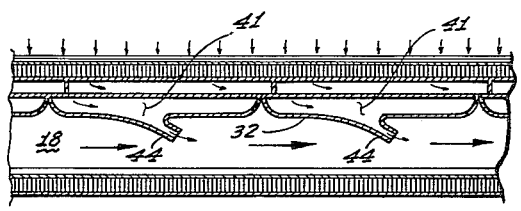

United States Patent Office 3,117,751
Patented Jan. 14, 1964

3,117,751
MEANS FOR REMOVING BOUNDARY LAYER
AIR FROM AIRCRAFT
Kenneth H. Rogers, Lakewood, and Werner Pfenninger, Palos Verdes, Calif., assignors to Northrop Corporation, Beverly Hills, Calif., a corporation of California
Filed Dec. 1, 1961, Ser. No. 156,386
6 Claims. (Cl. 244—42)

This invention pertains to means for removing predetermined amounts of boundary layer air from aircraft surfaces and more particularly to aircraft structural assemblies including means for controlling inflow distribution into and along suction ducts incorporated in the assemblies.

Means functioning to remove boundary layer air from aircraft structures and thereby provide low-drag laminar flow has been proposed and disclosed in our copending application, Serial Number 687,068. In this copending application a wing assembly is shown having a plurality of spanwise suction slots formed in the outer surface thereof. One or more of these suction slots communicate with suction ducts formed internally of the wing through bores or passageways of various sizes formed in an inner skin of said wing.

The required chordwise distribution of inflow can be achieved by slot design and individual valves functioning to control the flow of boundary layer air through the aforementioned suction ducts. The required spanwise distribution of inflow can be achieved—in theory—by the spanwise distribution of apertures or bores of various sizes connecting the suction slots and suction ducts. In practice, however, this method of achieving desired spanwise distribution of inflow may result in design difficulties. For example, the aperture or bore sizes may become too small to be formed by conventional methods, aerodynamic disturbances large enough to affect the boundary layer air may develop at the entrance to the apertures or bores and finally the pressure drop along a long suction duct may become excessive. In order to avoid the aforementioned difficulties improved means embracing a combination of tributary ducts and nozzles are suggested as disclosed herein.

Accordingly it is an object of this invention to provide means making possible the selective removal of boundary layer air from various areas of an aircraft surface.

Another object is to provide means adapted to meter and control the removal of boundary layer air from an aircraft surface.

Another object is to provide means to direct the metering jets of air downstream into the main suction duct thereby providing pressure recovery from fluid mixing.

Another object is to provide means adapted to remove boundary layer air from the external surfaces of an aircraft structure which requires a minimum of space for its installation, which is free of malfunctioning tendencies, which is simple in design and construction, which is economical to manufacture and which may be easily installed in various aircraft structures.

Although the characteristic features of the present invention are particularly pointed out in the appended claims the invention itself, also the manner in which it may be carried out, will be better understood by referring to the following description taken in connection with the accompanying drawings forming a part of this application and in which:

FIGURE 1 is a fragmentary plan view of an airplane including structure of the type disclosed herein for removing boundary layer air from the surfaces thereof.

FIGURES 2 and 3 are fragmentary cross-sectional and perspective views, respectively, of the wing shown in FIGURE 1.

FIGURE 3a is an enlarged sectional view taken on the line 3a—3a of FIGURE 4.

FIGURE 4 is a cross-sectional view taken on the line 4—4 in FIGURE 2 showing one embodiment of the tributary ducts employed in this disclosure.

FIGURES 5, 6 and 7 are longitudinal cross-sectional views similar to FIGURE 4 but illustrating other embodiments of the shaped members defining tributary ducts.

FIGURES 6a and 7a are cross-sectional views taken on the lines 6a—6a and 7a—7a, respectively, in FIGURES 6 and 7.

Referring to the drawings, FIGURES 1 and 2 show a portion of an airplane wing 11 including means for removing predetermined quantities of boundary layer air from various external surface areas thereof. The wing 11 includes inner and outer panel-like assemblies 12 and 14, respectively, secured to stringer members 16 and 17 having a spaced and substantially parallel relation as best seen in FIGURES 2 and 3. Although FIGURES 2 and 3 show only construction adjacent the upper skin of the wing 11 it should be understood that this type of construction is typical around the major portion of the periphery of the wing. The interior portion of the wing, therefore, defines a cavity housing fuel containers (not shown) which are completely surrounded by structure of the type shown in FIGURES 2 and 3.

The construction of the inner panel-like assembly 14 constitutes a conventional cellular core panel functioning to provide strength to the wing 11 and to define the upper wall of main suction air ducts 18 extending generally spanwise of the wing 11. The construction of the outer panel-like assembly 12 is shown and its construction will be better understood by referring to FIGURES 2 and 3a. The assembly 12 comprises a conventional cellular core subassembly 19 including a cellular core 21 and inner and outer plate members 22 and 23, respectively, as best seen FIGURE 3a. Rows of bores or passageways 24, conforming to a predetermined pattern, are provided in the assembly 19. The bores 24 extend completely through the panel assembly 19 and function to provide passages for the flow of air therethrough. Individual cell walls of the core 21 function to confine air as it flows through the panel assembly 19.

Bonded to the outer surface of the outer plate 23, in spaced and generally parallel relation and between each row of passageways 24, are strips 26 defining in part plenum chambers 27. Bonded to the exposed surface of the strips 26 is an outer sheet 28 constituting the skin of the wing 11. Formed in the skin 28 are a plurality of slots 29 normally having a parallel relation and functioning to provide fluid communication between the bores 24 and ambient or boundary layer air. In other words boundary layer air contacts the outer surface of the skin 28 at such time as the assembly 11 is in motion. In this respect the sheet member 28 is referred to as the outermost member of the assembly 12, the sheet member 22 as the inner member and is located inboard of the sheet member 28 and the panel-like member 14 as the innermost member and is located inboard of the member 22.

Bonded to the inner surface of the plate 22 are shaped members which may be individual members, identified by the numerals 31 and 32 in FIGURES 2, 3a, 4, 5, or continuous members identified by the numerals 33 and 34 in FIGURES 6-7a. One of the continuous members 33 or 34, or alternately a plurality of individual members 31 or 32, span one row of aligned passageways 24. In any event each of the members 31 or 32 and the continuous members 33 and 34 cooperate with the plate 22 to define a plurality of tributary ducts 41. A nozzle or a plurality of nozzles are provided in the shaped members 31-34, in other words a nozzle is provided allowing egress of air from each of the tributary ducts 41. The nozzles in each instance meters air sucked from the tributary ducts and accordingly control the amount of boundary layer air removed from the surface of the wing 11. By referring to FIGURES 2-7 it will be seen that the aforementioned individual and continuous shaped members may assume various configurations.

Referring to FIGURES 2, 3a, and 4, individual members 31 cover an aligned row of holes 24 and are arranged in end-to-end abutting relation. The members 31 are generally hat shaped in cross section, their upstream end is closed as indicated by the numeral 42 and the leg portions thereof are bonded to the plate 22 in fluid tight relation. Formed at the downstream end of the members 31 is a nozzle or metering orifice 43. The downstream ends and the upstream end of a adjacent members 31 cooperate to define the nozzles 43. The members 31 may be constructed of plastic or other suitable material and may be fabricated as an extrusion or each of the individual members may be formed by injection molding. If the members 31 are formed by a molding process their nozzles will be accurately formed, accordingly the nozzles 43 will accurately meter fluid or boundary layer air. By referring to FIGURE 4 it will also be seen that in the assembled relation of the members 31 their nozzles 43 are positioned so that all fluid is directed downstream in the ducts 18. Accordingly the fluid jets from the nozzles 43 mix with air flowing in the main suction duct 18. This results in an appreciable amount of pressure recovery along the suction duct. The pressure recovery of the jets permits exceptionally long suction ducts to be utilized without appreciable pressure-drop which is an important factor in suction system design. It will be understood that flow from the nozzles 43, also in the ducts 18, is due to suction pumps (not shown) which are located downstream in the ducts 18.

Individual members 32, as shown in FIGURE 5, may also be utilized to define the tributary ducts 41. These members are similarly arranged and are quite similar to those shown in FIGURES 2, 3a, and 4 except they are closed at both ends and define a nozzle 44 which is located midway between their ends. In this embodiment it will also be seen that the nozzles 44 are shaped so that fluid metered thereby is directed downstream in the ducts 18. The nozzle 44 being located midway between the ends of the members 32 insures that a more equal volume of air will be drawn through the passageways 24 which communicate with one of the tributary ducts 41.

The tributary ducts 41 may also be defined by continuous members as shown in FIGURES 6-7a. Referring first to FIGURES 6 and 6a, here the tributary ducts 41 are defined by continuous members 33 which are fabricated as extrusions or hot formed from sheet stock. The members 33 are hat shaped in cross section and the outer ends of their leg portions are bonded to the plate 22. At predetermined intervals wall portions of the members 33 intermediate the leg portions, hereafter referred to as the bite portion, are heated and shaped so that they double back upon themselves substantially as shown in FIGURES 6-6a. The end of the return bend of the lower fold 44 is cut off thus providing a nozzle or metering orifice indicated by the numeral 46. The return end of the upper fold 47 provides an interruption breaking the continuity of the channel provided by the member 33. In the assembled position of the members 33 on the plate 22 the folds 47 cooperate with other portions of the member 33 and the plate 22 to define the tributary ducts 41. In the embodiment shown the folds 47 do not completely close the continuous channels in the members 33 but they effectively block the flow of air from one tributary duct 41 to another; the quantity of air flowing past a fold 47 is quite small and for practical purposes can be disregarded. Also the members 33 are bonded to the plate 22 so that the nozzles 46 discharge in a downstream direction with respect to air flowing in the ducts 18.

The embodiment of the continuous member 34 shown in FIGURES 7 and 7a is quite similar to that shown in FIGURES 6 and 6a. The main difference being that a separate member 47 is utilized to provide a nozzle for the extrusion or hot formed sheet stock 34. The members 47 are mounted in apertures formed in the bite portion of the member 34 at predetermined longitudinal distances. The walls of the members 47 function to close the members 34 and thus provide the tributary ducts 41. Also members 34 are bonded to the plate 22 so that the nozzles 47 discharge in a downstream direction with respect to fluid flowing in the duct 18.

Thus it will be seen that an aircraft structure is disclosed including metering means making possible the selective removal of boundary layer air from the wing 11, the metering means providing a practical and efficient means for spanwise distribution of inflow and for ducting the inflow into the main suction ducts.

What is claimed is:

1. In an aircraft structural assembly incorporating means for removing boundary layer air therefrom, the combination comprising: a first sheet member constituting the outermost member of said assembly and over which air flows at such times as said assembly is in motion; a second sheet member; means securing said sheet members together in said assembly in spaced parallel relation so that said second sheet member is positioned inwardly of said first sheet member; passage means having inner and outer ends opening on said second and first sheet members, respectively; the inner ends of said passage means constituting rows of bores having a parallel relation and extending throughout the extent of said second sheet member; a third sheet member; members non-pervious to air securing said third sheet member in said assembly inboard of and in spaced parallel relation with respect to said second sheet member; said non-pervious members and second and third sheet members cooperating to define a main suction duct extending parallel to and spanning at least one of said rows of bores; shaped sheet members secured in fluid tight relation to the inner surface of said second sheet member providing a plurality of individual tributary ducts; said shaped sheet members spanning each of said rows of bores; and each of said shaped sheet members defining a nozzle adapted to meter and direct the flow of air through said passage means and from said tributary ducts.

2. In an aircraft structural assembly as set forth in claim 1: in which each of said nozzles are constructed and positioned to deliver air flowing therethrough in the same direction in said main duct.

3. In an aircraft structural assembly as set forth in claim 2: in which said shaped members span a predetermined number of bores of one of said rows of bores in a longitudinal direction.

4. In an aircraft structural assembly as set forth in claim 3: in which said shaped sheet members constitute a plurality of individual shaped sheet members arranged in end-to-end abutting relation; and one end of each of said individual shaped sheet members being rendered fluid tight and the other end cooperating with the fluid tight end of the adjacent individual shaped sheet member to define said nozzles.

5. In an aircraft structural assembly as set forth in claim 3: in which said shaped sheet members constitute a plurality of individual shaped sheet members arranged in end-to-end abutting relation; each end of said individual shaped sheet members being rendered fluid tight and said nozzle being located midway between the ends thereof.

6. In an aircraft structural assembly as set forth in claim 3: in which said shaped sheet members constitute a single sheet; portions of said single sheet being doubled back on itself to provide said individual tributary ducts and said nozzles being formed in said doubled back portion of said single sheet.

References Cited in the file of this patent
UNITED STATES PATENTS

| | | |
|---|---|---|
| 1,907,160 | Schauman | May 2, 1933 |
| 2,337,787 | Waller | Dec. 28, 1943 |
| 2,742,247 | Lachmann | Apr. 17, 1956 |
| 2,873,931 | Fleischman | Feb. 17, 1959 |
| 2,925,231 | Pfaff | Feb. 16, 1960 |